US 7,664,810 B2

(12) United States Patent
Crispin et al.

(10) Patent No.: US 7,664,810 B2
(45) Date of Patent: Feb. 16, 2010

(54) MICROPROCESSOR APPARATUS AND METHOD FOR MODULAR EXPONENTIATION

(75) Inventors: Thomas A. Crispin, Austin, TX (US); G. Glenn Henry, Austin, TX (US); Terry Parks, Austin, TX (US)

(73) Assignee: Via Technologies, Inc., Taipei (TW)

( * ) Notice: Subject to any disclaimer, the term of this patent is extended or adjusted under 35 U.S.C. 154(b) by 1025 days.

(21) Appl. No.: 11/130,472

(22) Filed: May 16, 2005

(65) Prior Publication Data

US 2005/0256920 A1    Nov. 17, 2005

Related U.S. Application Data

(60) Provisional application No. 60/571,124, filed on May 14, 2004, provisional application No. 60/582,422, filed on Jun. 24, 2004, provisional application No. 60/582,696, filed on Jun. 24, 2004.

(51) Int. Cl.
*G06F 7/38* (2006.01)
*H04L 9/00* (2006.01)
(52) U.S. Cl. .................................... 708/491
(58) Field of Classification Search .............. 708/491
See application file for complete search history.

(56) References Cited

U.S. PATENT DOCUMENTS

| 6,185,596 | B1 |  | 2/2001 | Hadad et al. |  |
|---|---|---|---|---|---|
| 7,353,364 | B1 | * | 4/2008 | Chong et al. | 712/215 |
| 2002/0059353 | A1 |  | 5/2002 | Koc et al. |  |
| 2003/0084309 | A1 | * | 5/2003 | Kohn | 713/189 |
| 2003/0140077 | A1 |  | 7/2003 | Zaboronski et al. |  |
| 2004/0054705 | A1 |  | 3/2004 | Le Quere |  |
| 2004/0096057 | A1 |  | 5/2004 | Moore |  |
| 2005/0033790 | A1 |  | 2/2005 | Hubert |  |
| 2005/0084099 | A1 |  | 4/2005 | Montgomery |  |

FOREIGN PATENT DOCUMENTS

EP     0601907     6/1994

OTHER PUBLICATIONS

MIPS Technologies, Inc. 64-Bit Architecture Speeds RSA by 4x. Jun. 2002; MIPS Technologies, Inc.; Mountain View, CA, US.
Cetin Kaya Koc, Tolga Acar, and Burton S. Kaliski Jr. Analyzing and Comparing Montgomery Multiplication Algorithms. IEEE Micro, pp. 26-33, Jun. 1996. http://citeseer.csail.mit.edu/koc96analyzing.html.

(Continued)

*Primary Examiner*—Chuong D Ngo
(74) *Attorney, Agent, or Firm*—Richard K. Huffman; James W. Huffman (57) ABSTRACT

A technique is provided for performing modular multiplication. In one embodiment, an apparatus in a microprocessor is provided for accomplishing modular multiplication operations. The apparatus includes translation logic and execution logic. The translation logic receives an atomic Montgomery multiplication instruction from a source therefrom, where the atomic Montgomery multiplication instruction prescribes generation of a Montgomery product. The translation logic translates the atomic Montgomery multiplication instruction into a sequence of micro instructions specifying sub-operations required to accomplish generation of the Montgomery product. The execution logic is operatively coupled to the translation logic. The execution logic receives the sequence of micro instructions, and performs the sub-operations to generate the Montgomery product.

17 Claims, 5 Drawing Sheets

OTHER PUBLICATIONS

Cetin Kaya Koc. High-Speed RSA Implementation, RSA Laboratories, Redwood City, Nov. 1994 http://citeseer.csail.mit.edu/336292.html.

Peter L. Montgomery. Modular Multiplication Without Trial Division. Mathematics of Computation; vol. 44, No. 170; pp. 519-521. Apr. 1985.

Cetin Kaya Koc. RSA Hardware Implementation. RSA Laboratories Technical Report TR-801; Version 1.0; Apr. 19, 1996. RSA Laboratories. Redwood City, CA, US.

Goodman et al. "An Energy-Efficient Reconfigurable Public-Key Cryptography Processor." IEEE Journal of Solid-State Circuits, IEEE, Service Center, Piscataway, NJ, US. vol. 36, No. 11, Nov. 2001. pp. 1808-1820, XP002399282.

Xiaoyang Zeng et al. "A Reconfigurable Public-Key Cryptography Coprocessor." Advanced System Integrated Circuits 2004. Proceedings of 2004 IEEE Asia-Pacific Conference on Fukuoka, Japan Piscataway, NJ. USA IEEE, US. Aug. 4, 2004. pp. 172-175. XP010733915.

Batina et al. "Hardware Architectures for Public Key Cryptography." Integration, the VLSI Journal, North-Holland Publishing Company. Amsterdam, NL. vol. 34, No. 1-2, May 2003. pp. 1-64. XP004423437.

Zhou et al. "Architectural Enhancements for Montgomery Multiplication on Embedded RISC Processors." ANCS 2003, LNCS 2846, Sprinter-Verlag Berlin Heidelberg 2003, 2003, pp. 418-434. XP002399247.

Blum et al. "Montgomery Modular Exponentiation on Reconfigurable Hardware." Computer Arithmetic. 1999. Proceedngs. 14th IEEE Symposium on Adelaide, SA, Australia. Apr. 14-16, 1999. Los Alamitos, CA, USA. IEEE Comput. Soc, US. Apr. 14, 1999. pp. 70-77. XP010332298.

Drutarovsky et al. "Comparison of Two Implementations of Scalable Montgomery Coprocessor Embedded in Reconfigurable Hardware." Proceedings of the XIX-TH Conference on Design of Circuits and Integrated Systems. vol. ISBN, No. 2-0522971-0-X. 2004, pp. 240-245. XP002399248. Bordeaux, France.

Naccache D et al. "Cryptographic Smart Cards." IEEE Micro, IEEE Service Center, Los Alamitos, CA. US. vol. 16, No. 3, Jun. 1, 1996. pp. 14-24. XP000594074.

Muhammad Ali Mazidi, Janice Gillispie Mazidi: The 80×86 IBM PC and Compatible Computersn 2000, Prentice Hall, London.

"Via PadLock Hardware Security Suite" Via Technologies White Paper, May 2004, pp. 1-10.

* cited by examiner

| GROUP MODE | MODE |
|---|---|
| 0xC0 | MONTGOMERY PRODUCT |
| ALL OTHER VALUES | RESERVED |

MICROPROCESSOR APPARATUS AND METHOD FOR MODULAR EXPONENTIATION

CROSS-REFERENCE TO RELATED APPLICATIONS

This application claims the benefit of the following U.S. Provisional Applications, each of which is herein incorporated by reference for all intents and purposes.

| SER. NO. | FILING DATE | TITLE |
| --- | --- | --- |
| 60/571124 (CNTR.2237) | May 14, 2004 | MONTGOMERY MULITPLIER MECHANSIM |
| 60/582422 (CNTR.2253) | Jun. 24, 2004 | SECURITY APPLICATION NOTE |
| 60/582696 (CNTR.2254) | Jun. 24, 2004 | MONTGOMERY MULTIPLIER PROGRAMMING GUIDE |

BACKGROUND OF THE INVENTION

This invention relates in general to the field of microelectronics, and more particularly to an apparatus and method in a microprocessor or other device for performing modular multiplication.

DESCRIPTION OF THE RELATED ART

An early computer system operated independently of other computer systems in the sense that all of the input data required by an application program executing on the early computer system was either resident on that computer system or was provided by an application programmer at run time. The application program generated output data as a result of being executed and the output data was generally in the form of a paper printout or a file which was written to a magnetic tape drive, disk drive, or other type of mass storage device that was part of the computer system. The output file could then be used as an input file to a subsequent application program that was executed on the same computer system or, if the output data was previously stored as a file to a removable or transportable mass storage device, it could then be provided to a different, yet compatible, computer system to be employed by application programs thereon. On these early systems, the need for protecting sensitive information was recognized and, among other information security measures, cryptographic application programs were developed and employed to protect the sensitive information from unauthorized disclosure. These cryptographic programs typically scrambled and unscrambled the output data that was stored as files on mass storage devices.

It was not many years thereafter before users began to discover the benefits of networking computers together to provide shared access to information. Consequently, network architectures, operating systems, and data transmission protocols commensurately evolved to the extent that the ability to access shared data was not only supported, but prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized disclosure has grown dramatically. The number of instances during a given computer session where a user is obliged to protect his or her sensitive data has substantially increased. Current news headlines regularly force computer information security issues such as spam, hacking, identity theft, reverse engineering, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the protection of proprietary information.

The field of information security that provides us with techniques and means to encode data so that it can only be decoded by specified individuals is known as cryptography. When particularly applied to protecting information that is stored on or transmitted between computers, cryptography most often is utilized to transform sensitive information (known in the art as "plaintext" or "cleartext") into an unintelligible form (known in the art as "ciphertext"). The transformation process of converting plaintext into ciphertext is called "encryption," "enciphering," or "ciphering" and the reverse transformation process of converting ciphertext back into plaintext is referred to as "decryption," "deciphering," or "inverse ciphering."

Within the field of cryptography, several procedures and protocols have been developed that allow for users to perform cryptographic operations without requiring great knowledge or effort and for those users to be able to transmit or otherwise provide their information products in encrypted forms to different users. Along with encrypted information, a sending user typically provides a recipient user with a "cryptographic key" that enables the recipient user to decipher the encrypted information thus enabling the recipient user to recover or otherwise gain access to the unencrypted original information. One skilled in the art will appreciate that these procedures and protocols generally take the form of password protection, mathematical algorithms, and application programs specifically designed to encrypt and decrypt sensitive information.

Several classes of algorithms are currently used to encrypt and decrypt data. Algorithms according to one such class (i.e., public key cryptographic algorithms, an instance of which is the RSA algorithm) employ two cryptographic keys, a public key and a private key, to encrypt or decrypt data. According to some of the public key algorithms, a recipient's public key is employed by a sender to encrypt data for transmission to the recipient. Because there is a mathematical relationship between a user's public and private keys, the recipient employs his private key to decrypt the transmission in order to recover the data. Although this class of cryptographic algorithms enjoys widespread use today, encryption and decryption operations are excruciatingly slow—even on small amounts of data. A second class of algorithms, known as symmetric key algorithms, provide commensurate levels of data security and can be executed much faster than public key algorithms. Such algorithms are called symmetric key algorithms because they use a single cryptographic key to both encrypt and decrypt information. In the public sector, the most prevalent single-key cryptographic algorithms include the Data Encryption Standard (DES), Triple DES, and the Advanced Encryption Standard (AES). Because of the strength of these algorithms to protect sensitive data, they are used now by U.S. Government agencies, but it is anticipated by those in the art that one or more of these algorithms will become the standard for commercial and private transactions in the near future.

As noted above, symmetric key cryptographic algorithms can be executed significantly faster than public key algorithms. At present, it is estimated that symmetric key cryptography is roughly 1,000 times faster than public key (also known as asymmetric key) cryptography. But any cryptosystem that employs a symmetric key technique is subject to compromise any time the key is compromised. And such is of immediate concern during this era of commerce over the Internet because it is virtually certain that the party that is encrypting a message for transmission (for, say, payment of a bill) will not personally know the party that will be decrypting the message. Thus, the distribution and protection of symmetric keys is very problematic. But the use of public key cryptography solves the symmetric key-compromise dilemma because in most instances a public key cryptographic algorithm is used to encrypt and transmit a randomly selected "session" key to a receiving party. The receiving party thus employs the public key algorithm using a private key to decrypts the encoded message, thus obtaining the session key. Now that both parties have the session key, it is employed by a symmetric key algorithm for encryption and decryption of messages between the two parties during the session to encrypt/decrypt sensitive information at a much faster rate than would be achievable if a public key algorithm were used for the entire session. Then when the messaging session is over, the session key is discarded by both parties.

RSA (named after it's three inventors: Ron Rivest, Adi Shamir, and Leonard Adleman) is today's most prevalently employed public key algorithm. RSA is based upon the infeasibility of factoring large numbers. Both public and private keys are functions of prime numbers. More specifically, two random large prime numbers, p and q, are selected. Their product, n=pq, is taken as a modulus. The public key (encryption key), e, is selected such that e and the product (p-1)(q-1) are relatively prime. A private key (decryption key), d, is computed using known methods such that $ed = 1 \mod p-1)(q-1)$.

As a result, both keys e, d are relatively prime. Following selection of the keys, the numbers p and q are not required. A message, m, is first divided into blocks, $m_i$, that are smaller than the modulus, n. A present day modulus length typically ranges from several hundred bits to tens of thousands of bits. The encrypted message, c, is made up of blocks, $c_i$, of the same length. According to RSA, a message block, $m_i$, is encrypted by using the public key, e, and modulus, n, as follows:

$c_i = m_i^e \mod n$ and an encrypted block, $c_i$, is decrypted back into a message block, $m_i$, using the private key, d, and modulus, n, as follows:

$m_i = c_i^d \mod n$

Note that both the encryption and decryption formulas for RSA rely upon modular exponentiation as a fundamental operation. And, depending upon the key sizes chosen, the number of modular multiplications that are required to encrypt a single message block, $m_i$, can extend into the tens of thousands. One skilled in the art will appreciate that each modular multiplication sub-operation that is performed as part of performing a modular exponentiation operation requires both a multiplication operation (e.g., $x_i = m_i m_i$) and a trial division operation (e.g., $y_i = x_i/n$) to perform the modular reduction. One skilled will also appreciate that while multiplication of two large integers is not a trivial task for a present day computer, trial division is significantly more complicated. In addition, although a number of algorithms have been developed to reduce the number of multiplications that are required to perform modular exponentiation, there remains only one prevalently employed algorithm that provides for complete elimination of trial divisions. Developed by Peter L. Montgomery, the so-called Montgomery multiplication algorithm provides for elimination of the trial division step in a modular multiplication operation by first converting the multiplication operation's operands into corresponding N-residue operands within a specified finite number system of modulus N. Therein, operations are performed to effect multiplication of the multiplication operation's operands by performing specified operations on the N-residue operands, where trial division is replaced by bit-shift operations—thus significantly reducing the number of complex operations that are required. It is beyond the scope of this application to provide an in-depth discussion of Montgomery multiplication and corresponding modular reduction techniques. Such is described within numerous extant papers and textbooks, one of which is Montgomery's own article, "Modular Multiplication Without Trial Division," which was published in *Mathematics of Computation,* Vol. 44, Number 170, April 1985, pages 519-521, American Mathematical Society, Washington, D.C., and which is herein incorporated by reference for all intents and purposes.

The overhead that is required to convert modular multiplication operands into N-residue operands is quite significant for performance of a single modular multiplication, but for modular exponentiation, particularly in those cases having exponents which are thousands of bits in length, Montgomery multiplication becomes a highly desirable technique because the time required to convert operands to and from the finite number system pales in comparison to the time saved through elimination of thousands of trial division steps.

Notwithstanding that there are a significant number of software algorithms which have been developed to increase the speed by which modular exponentiation is performed on a computing device, and recognizing in addition that dedicated hardware exists in the marketplace for performing RSA encryption and decryption, the present inventors have noted an increasing need to efficiently and rapidly perform modular exponentiation operations on a desktop, laptop, or set-top computing device. Most, if not all of these devices, and others, utilize a microprocessor as the central processor therein, and thus do not provide for the addition of dedicated RSA computational hardware. Moreover, it is recognized that RSA is not the only algorithm that is employed today that requires modular exponentiation operations to be performed.

Accordingly, the present inventors have observed that it is very advantageous to provide apparatus and methods for performing Montgomery multiplication on a microprocessor or like device. It is furthermore desirable to provide an instruction for execution on a microprocessor or like processing device that directs generation of a Montgomery product.

SUMMARY OF THE INVENTION

The present invention, among other applications, is directed to solving these and other problems and disadvantages of the prior art. The present invention provides a superior technique for performing modular multiplication. In one embodiment, an apparatus in a microprocessor is provided for accomplishing modular multiplication operations. The apparatus includes translation logic and execution logic. The translation logic receives an atomic Montgomery multiplication instruction from a source therefrom, where the atomic Montgomery multiplication instruction prescribes generation of a Montgomery product. The translation logic translates the atomic Montgomery multiplication instruction into a sequence of micro instructions specifying sub-operations required to accomplish generation of the Montgomery product. The execution logic is operatively coupled to the translation logic. The execution logic receives the sequence of micro instructions, and performs the sub-operations to generate the Montgomery product.

One aspect of the present invention contemplates an apparatus for performing modular multiplication operations. The apparatus has an atomic Montgomery multiplication instruction and execution logic. The atomic Montgomery multiplication instruction is received by logic within a processor, where the atomic Montgomery multiplication instruction prescribes generation of a Montgomery product. The execution logic is coupled to the logic, and is configured to generate the Montgomery product.

Another aspect of the present invention comprehends a method for performing modular multiplication operations in a processor. The method includes fetching an atomic Montgomery multiplication instruction from memory, where the atomic Montgomery multiplication instruction prescribes generation of a Montgomery product; and executing the atomic Montgomery multiplication instruction to generate the Montgomery product.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
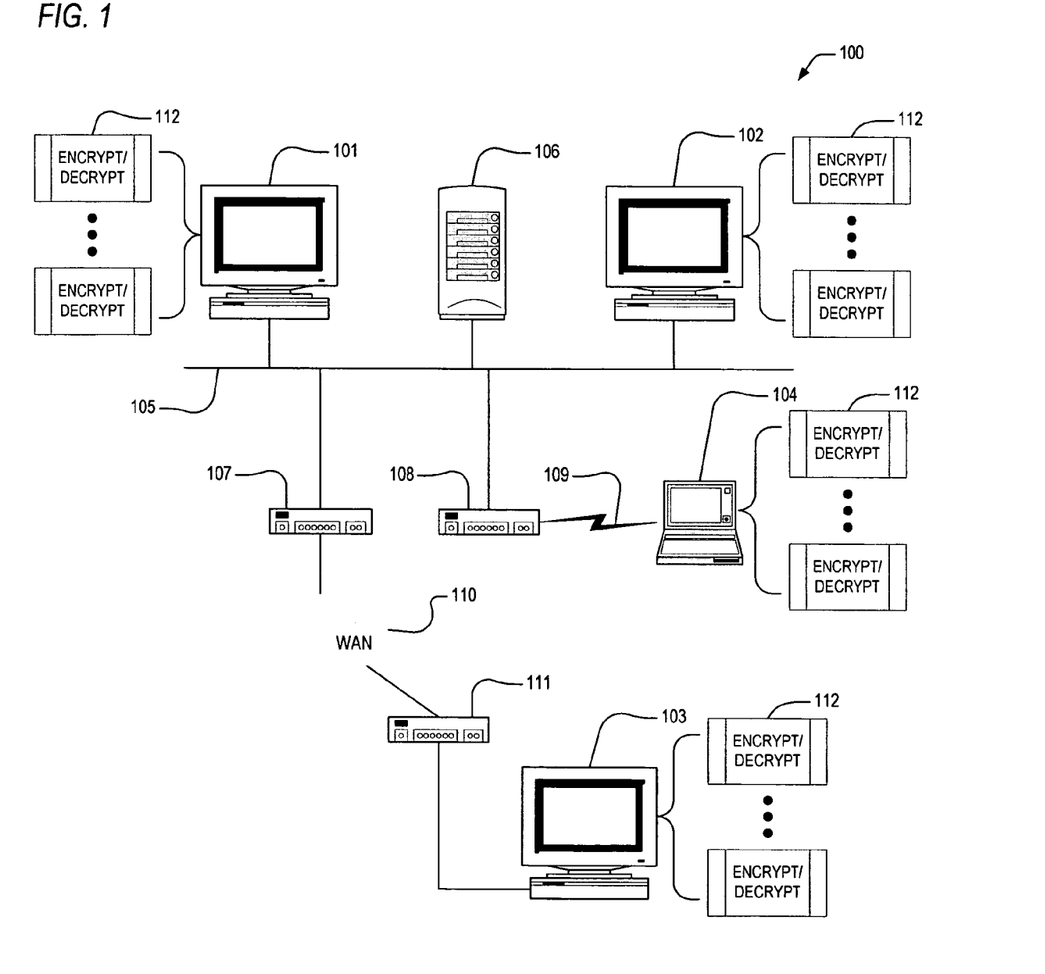
FIG. 1 is a block diagram illustrating present day cryptography applications where modular exponentiation is employed to distribute and protect session keys or other data.
Figure 2:
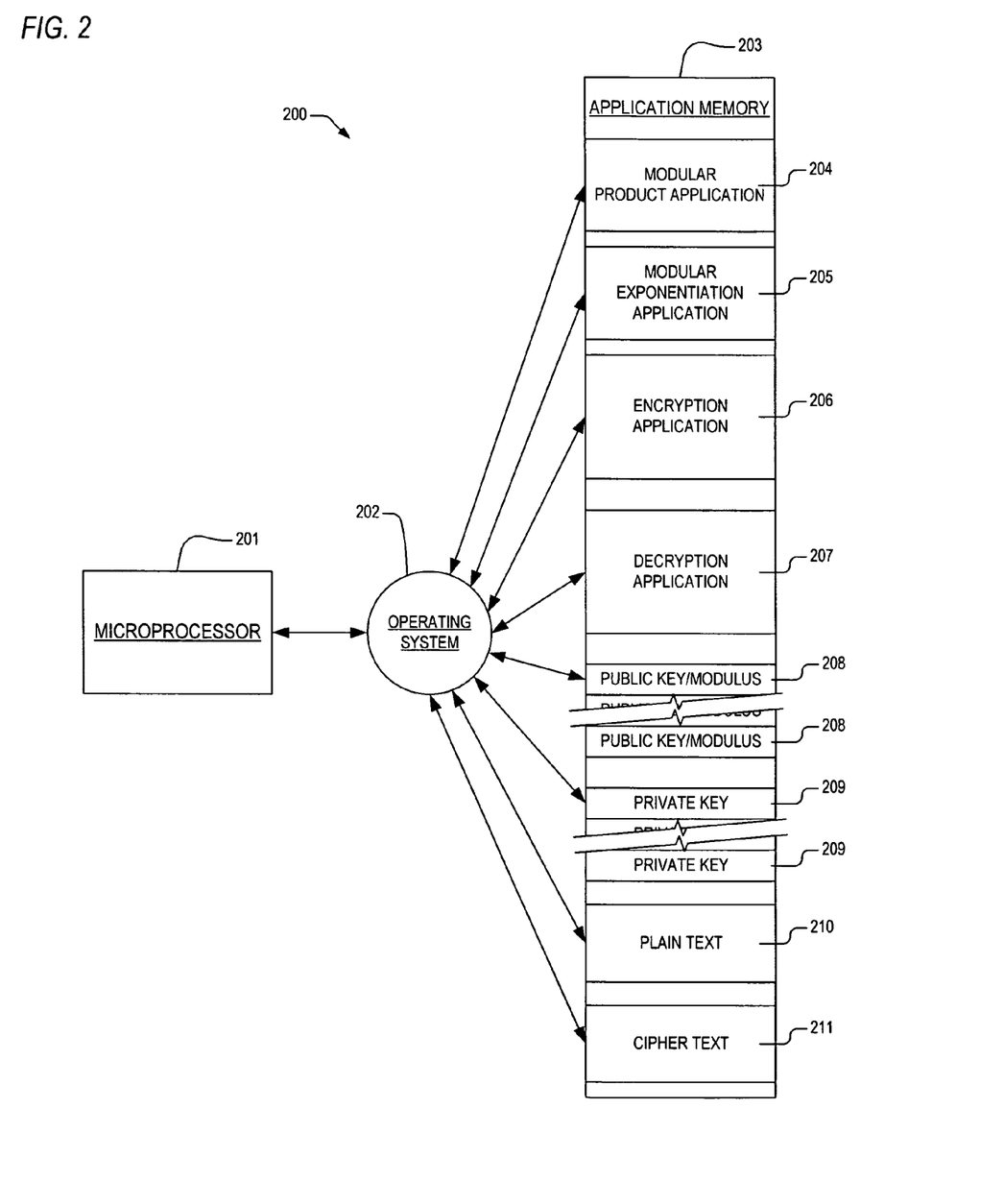
FIG. 2 is a block diagram depicting techniques for performing cryptographic operations for which modular multiplication operations are extensively employed.

In view of the above background discussion on modular exponentiation operations and associated techniques employed within present day computer systems, a detailed discussion of these techniques and their limitations will now be provided with reference to FIGS. 1-2. Following this, the present invention will be discussed with reference to FIGS. 3-6. The present invention provides an apparatus and method for performing modular exponentiation operations in a present day computer system that exhibits superior performance characteristics over prevailing techniques and furthermore provides for limited operating system intervention, atomicity, and legacy and architectural compatibility.

One skilled in the art will appreciate that there are numerous application programs available for execution on a computer system that can perform modular exponentiation operations. In fact, some operating systems (e.g. Microsoft® WindowsXP®, Linux) provide direct services in the form of primitives, application program interfaces, and the like. The present inventors, however, have observed that present day computer cryptography techniques are deficient in several respects. Thus, the reader's attention is now directed to FIG. 1, whereby these deficiencies are highlighted and discussed below.

FIG. 1 is a block diagram 100 illustrating present day computer cryptography applications where modular exponentiation is employed to distribute and protect session keys or other data. The block diagram 100 depicts a first computer workstation 101 connected to a local area network 105. Also connected to the network 105 is a second computer workstation 102, a network file storage device 106, a first router 107 or other form of interface to a wide area network (WAN) 110 such as the Internet, and a wireless network router 108 such as one of those compliant with IEEE Standard 802.11. A laptop computer 104 interfaces to the wireless router 108 over a wireless network 109. At another point on the wide area network 110, a second router 111 provides interface for a third computer workstation 103.

As alluded to above, a present day user is confronted with the issue of computer information security many times during a work session. For example, under the control of a present day multi-tasking operating system, a user of workstation 101 can be performing several simultaneous tasks, each of which require the execution of cryptographic operations, and each of which require generation and distribution of different session keys. The user of workstation 101 is required to run an encryption/decryption application 112 (either provided as part of the operating system or invoked by the operating system) to store a local file on the network file storage device 106. Concurrent with the file storage, the user can transmit an encrypted message to a second user at workstation 102, which also requires executing an instance of the encryption/decryption application 112. The encrypted message may be real-time (e.g., an instant message) or non-real-time (i.e. email). In addition, the user can be accessing or providing his/her financial data (e.g., credit card numbers, financial transactions, etc.) or other forms of sensitive data over the WAN 110 from workstation 103. Workstation 103 could also represent a home office or other remote computer 103 that the user of workstation 101 employs when out of the office to access any of the shared resources 101, 102, 106 107, 108, 109 on local area network 105. Each of these aforementioned activities requires that a corresponding instance of the encryption/decryption application 112 be invoked, and each of these instances requires the generation and distribution of random session keys to allow for employment of symmetric key cryptographic algorithms to encrypt and decrypt data. Furthermore, wireless networks 109 are now being routinely provided in coffee shops, airports, schools, and other public venues, thus prompting a need for a user of laptop 104 to encrypt/decrypt not only his/her messages to/from other users, but to encrypt/decrypt all communications over the wireless network 109 to the wireless router 108. And each session over a wireless network 109 requires the generation and distribution of session keys.

One skilled in the art will therefore appreciate that along with each activity that requires cryptographic operations at a given workstation 101-104, there is a corresponding requirement to invoke an instance of the encryption/decryption application 112 and to generate and distribute a session key. Hence, a computer 101-104 in the near future could potentially be generating and distributing hundreds of session keys. A military, financial, or e-commerce server could potentially require the generation of thousands of session keys per second.

The present inventors have noted several limitations to the above approach of performing cryptographic operations by invoking one or more instances of an encryption/decryption application 112 on a computing system 101-104. For example, performing a prescribed function via programmed software is exceedingly slow compared to performing that same function via dedicated hardware. Each time the encryption/decryption application 112 is required, a current task executing on a computer 101-104 must be suspended from execution, and parameters of the cryptographic operation (i.e., plaintext, ciphertext, etc.) must be passed through the operating system to the instance of the encryption/decryption application 112, which is invoked for accomplishment of the cryptographic operation and either the encryption/decryption application 112 itself, or an operating system primitive must be called upon to encrypt/decrypt a session key to provide for symmetric cryptographic techniques. And because session key encryption/decryption algorithms such as RSA necessarily involve thousands of modular multiplication operations to encode/decode a session key, a trial division operation must be executed for each one of the thousands of modular multiplication operations. Thus overall system processing speed is disadvantageously affected. One skilled in the art will appreciate that sending a small encrypted email message in MICROSOFT® OUTLOOK® can take up to five times as long as sending an unencrypted email message.

In addition, current techniques are limited because of the delays associated with operating system intervention. Most application programs do not provide modular exponentiation components; they employ components of the operating system or plug-in applications to accomplish these tasks. And operating systems are otherwise distracted by interrupts and the demands of other currently executing application programs.

Furthermore, the present inventors have noted that the accomplishment of session key encryption/decryption operations on a present day computer system 101-104 is very much analogous to the accomplishment of floating point mathematical operations prior to the advent of dedicated floating point units within microprocessors. Early floating point operations were performed via software and they executed very slowly. Like floating point operations, modular exponentiation operations performed via software are disagreeably slow. As floating point technology evolved further, floating point instructions were provided for execution on floating point co-processors. These floating point co-processors executed floating point operations much faster than software implementations, yet they added cost to a system. Likewise, RSA co-processors exist today in the form of add-on boards or external devices that interface to a host processor via parallel ports or other interface buses (e.g., USB). These co-processors certainly enable the accomplishment of modular multiplication operations much faster than pure software implementations. But these co-processors are algorithm-specific (e.g., RSA), they add cost to a system configuration, they require extra power, and they decrease the overall reliability of a system. Cryptographic co-processor implementations are additionally vulnerable to snooping because the data channel is not on the same die as the host microprocessor.

Therefore, the present inventors recognize a need for dedicated modular exponentiation hardware within a present day microprocessor such that an application program that requires a Montgomery multiplication operation can direct the microprocessor to generate a Montgomery product via execution of a single, atomic, Montgomery multiplication instruction. The present inventors also recognize that such a capability should be provided so as to limit requirements for operating system intervention and management. Also, it is desirable that the Montgomery multiplication instruction be available for use at an application program's privilege level and that the dedicated hardware for generating the Montgomery product comport with prevailing architectures of present day microprocessors. There is also a need to provide the Montgomery multiplication hardware and associated Montgomery multiplication instruction in a manner that supports compatibility with legacy operating systems and applications. It is moreover desirable to provide an apparatus and method for performing Montgomery multiplication operations that are resistant to unauthorized observation.

Now turning to FIG. 2, a block diagram 200 is presented depicting techniques for performing public key cryptographic operations in a present day computer system as discussed above. The block diagram 200 includes a microprocessor 201 that fetches instructions and accesses data associated with an application program from an area of system memory called application memory 203. Program control and access of data within the application memory 203 is generally managed by operating system software 202 that resides in a protected area of system memory. As discussed above, if an executing application program (e.g., an email program or a file storage program) requires that a cryptographic operation be performed, say, encryption or decryption of a session key, the executing application program must accomplish the cryptographic operation by directing the microprocessor 201 to execute a significant number of instructions. These instructions may be subroutines that are part of the executing application program itself, they may be plug-in applications that are linked to the executing application program, or they may be services that are provided by the operating system 202. Regardless of their association, one skilled in the art will appreciate that the instructions will reside in some designated or allocated area of memory. For purposes of discussion, these areas of memory are shown within the application memory 203 and comprise an encryption application 206 and a decryption application 207. The encryption application 206 executes instructions that access blocks of plaintext 210. The encryption application 206 executes the instructions therein to generate corresponding blocks of ciphertext 211. In the context of the discussion above, the plaintext 210 could be a randomly generated session key and the ciphertext 211 could be the session key encrypted according to the RSA algorithm. Consequently the encryption application 206 would perform the modular exponentiation operations specified according to RSA. In doing so, the encryption application 206 would access one of a plurality of public key storage areas 208 in memory 203 that correspond to the recipient of the session key that is to be encrypted. The public key storage areas 208 contain a unique public key and modulus for each intended recipient. Similarly, as alluded to above, a decryption application 207 is employed to perform modular exponentiation operations according to RSA. The decryption application 207 executes instructions that access blocks of the ciphertext 211. The decryption application 207 executes the instructions therein to generate corresponding blocks of plaintext 210. Similarly, in the context of the discussion above, the ciphertext 211 could be an encrypted session key and the plaintext 210 could be the session key decrypted according to the RSA algorithm. Consequently the decryption application 207 would perform the modular exponentiation operations specified according to RSA. In doing so, the decryption application 207 would access one of a plurality of private key storage areas 209 in memory 203 that correspond to the transmitter of the encrypted session key that is to be decrypted.

In the case of both encryption and decryption, both the encryption application 206 and the decryption application 207 may employ the services of a modular exponentiation subroutine 205 or operating system primitive to perform the modular exponentiation operations required therein. Furthermore, the modular exponentiation application 205 may employ the services of a modular product application 204 to perform each of the modular multiplications that are required in each of the modular exponentiation operations. And, as noted above, the modular product application 204 may employ a Montgomery multiplication technique to perform each modular multiplication operation.

It is noteworthy, though, that a significant number of instructions must be fetched from memory and executed in order to generate a single modular product, and this number of instructions is multiplied by the value of each exponent that is provided for encryption or decryption. In addition to fetching these instructions from the modular product application 204 many times over, each of these instructions must be executed by the microprocessor 201 in order to generate a requested modular product. Furthermore, the execution of instructions to encrypt/decrypt a session key is generally seen as superfluous to the primary purposes (e.g., file management, instant messaging, email, remote file access, credit card transaction) of a currently executing application program. Consequently, a user of the currently executing application program senses that the currently executing application is performing inefficiently. In the case of stand-alone or plug-in encryption and decryption applications 206, 207, invocation and management of these applications 206, 207 must also be subject to the other demands of the operating system 202 such as supporting interrupts, exceptions, and like events that further exacerbate the problem. Moreover, for every concurrent cryptographic operation that is required on a computer system, a separate instance of the applications 206, 207 may have to be allocated in memory 203. And, as noted above, it is anticipated that the number of concurrent cryptographic operations required to be performed by a microprocessor 201 will continue to increase with time.

The present inventors have noted the problems and limitations of current computer system cryptographic techniques and furthermore recognize a need to provide apparatus and methods for performing modular multiplication operations including generation of Montgomery products in a microprocessor which do not exhibit disadvantageous program delays to users. Accordingly, the present invention provides microprocessor apparatus and associated methods for performing modular exponentiation operations via a dedicated Montgomery multiplication instruction and Montgomery multiplication hardware therein. The Montgomery multiplication hardware is activated to perform Montgomery multiplication operations via programming of the single Montgomery multiplication instruction. The present invention will now be discussed with reference to FIGS. 3-6.

Figure 3:
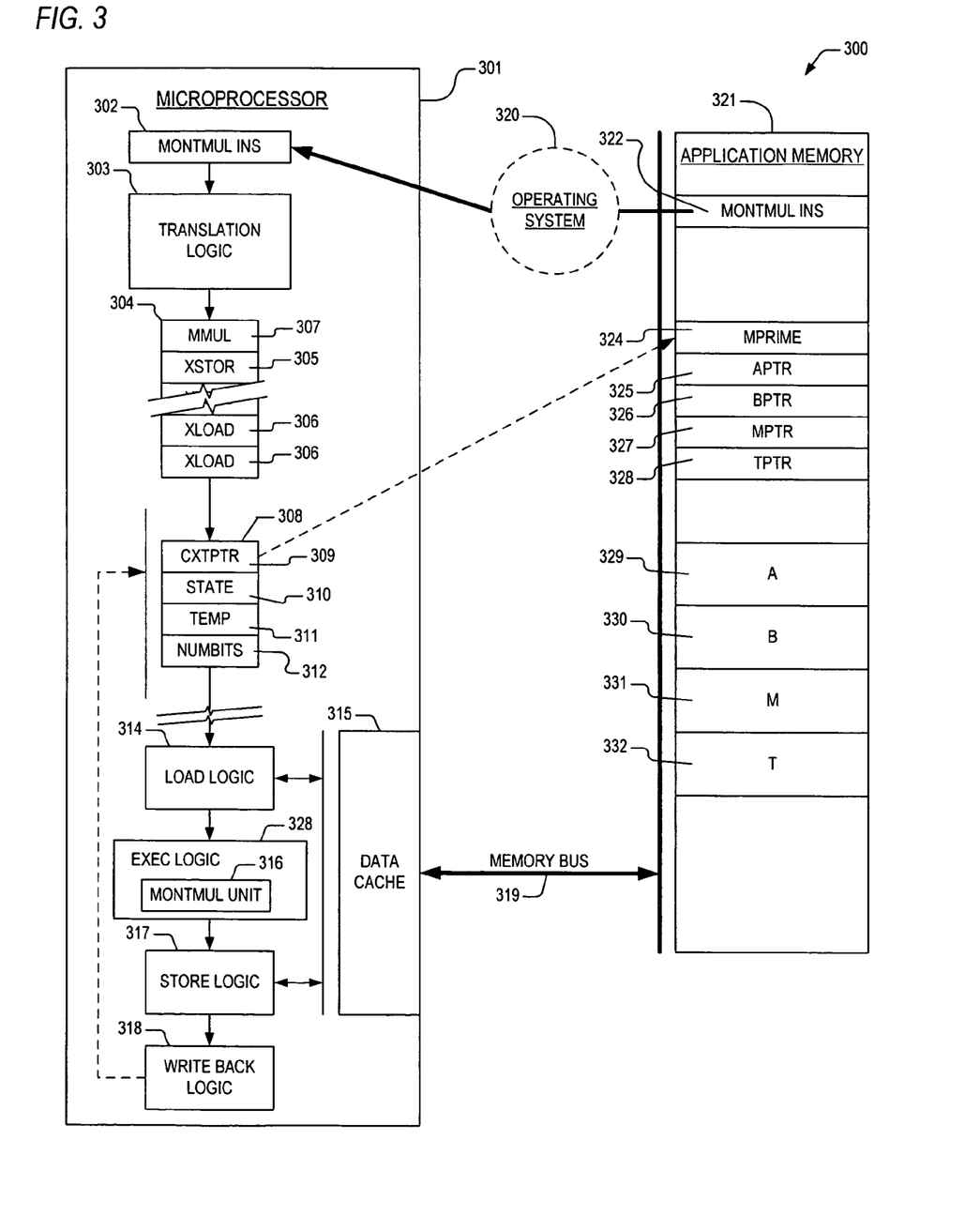
FIG. 3 is a block diagram featuring a microprocessor apparatus according to the present invention for performing Montgomery multiplication operations.

Referring to FIG. 3, a block diagram 300 is provided featuring a microprocessor apparatus according to the present invention for performing Montgomery multiplication operations. The block diagram 300 depicts a microprocessor 301 that is coupled to a system memory 321 via a memory bus 319. The microprocessor 301 includes translation logic 303 that receives instructions from an instruction register 302 within a fetch logic stage. The translation logic 303 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 303 may be shared with other circuits, microcode, etc., that are employed to perform other functions within the microprocessor 301. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor. The translation logic 303 is coupled to a micro instruction queue 304. The micro instruction queue 304 has a plurality of micro instruction entries 305-307. Micro instructions are provided from the micro instruction queue 304 to register stage logic that includes a register file 308. The register file 308 has a plurality of registers 309-312 whose contents are established prior to performing a prescribed Montgomery multiplication operation. A context pointer CXTPTR programmed into register 309 prior to execution of a Montgomery multiplication operation points to corresponding locations 324-328 in memory 321 that contain data which is required to perform the prescribed Montgomery multiplication operation. In one embodiment, a state register 310 and a temp register 311 must be initialized to zero. The state and temp registers 310-311 are employed during execution of the Montgomery multiplication operation to save intermediate data to allow for servicing of interrupts. A numbits register 312 is programmed prior to execution of the Montgomery multiplication operation to indicate the number of bits in operands A, B, M required to generated a Montgomery product. The register stage is coupled to load logic 314, which interfaces to a data cache 315 for retrieval of data for performance of the prescribed Montgomery multiplication operation. The data cache 315 is coupled to the memory 321 via the memory bus 319. Execution logic 328 is coupled to the load logic 314 and executes the operations prescribed by micro instructions as passed down from previous stages. The execution logic 328 comprises logic, circuits, devices, or microcode (i.e., micro instructions or native instructions), or a combination of logic, circuits, devices, or microcode, or equivalent elements that are employed to perform operations as prescribed by instructions provided thereto. The elements employed to perform the operations within the execution logic 328 may be shared with other circuits, microcode, etc., that are employed to perform other functions within the microprocessor 301. The execution logic 328 includes a Montgomery multiplication unit 316. The Montgomery multiplication unit 316 receives data required to perform the prescribed Montgomery multiplication operation from the load logic 314, in addition to that provided by the register file 308. Micro instructions direct the Montgomery multiplication unit 316 to load and store data to and from memory 321, and to generate a Montgomery product of a first operand A and a second operand B using a modulus M and an integer value MPRIME, where MPRIME is a function of a radix R (not shown) and the modulus M as prescribed by Montgomery's multiplication algorithm cited above. In all embodiments, the radix R is implicitly specified through the size of the operands A, B, M, and MPRME to be a power of 2, and thus is not required to be provided by the user. The integer value MPRIME, however, must be provided. In one embodiment, the number of bits in the first operand A, the second operand B, and the modulus M, which is loaded into the numbits register 312 prior to execution of the Montgomery multiplication operation, is required to be an integer multiple of 128, and the maximum number of bits is required to be less than or equal to 32,768. Location 324 in memory 321 contains the integer MPRIME. Location 325 contains a pointer APTR to a first location 329 in memory 321 that contains the first operand A. Location 326 contains a pointer BPTR to a second location 330 in memory 321 that contains the second operand B. Location 327 contains a pointer MPTR to a third location 331 in memory 321 that contains the modulus M. And location 328 contains a pointer TPTR to a fourth location 332 in memory 321 that contains a Montgomery product that is generated using A, B, M, and MPRIME. Locations 324-332 must be initialized by the user as described above prior to execution of the Montgomery multiplication operation. The Montgomery product is stored to location 332 following its generation.

The Montgomery multiplication unit 316 comprises logic, circuits, devices, or microcode (i.e., micro instructions or native instructions), or a combination of logic, circuits, devices, or microcode, or equivalent elements that are employed to perform Montgomery multiplication operations. The elements employed to perform the Montgomery multiplication operations within the Montgomery multiplication unit 316 may be shared with other circuits, microcode, etc., that are employed to perform other functions within the microprocessor 301. In one embodiment, the Montgomery multiplication unit 316 operates in parallel to other execution units (hot shown) within the execution logic 328 such as an integer unit, floating point unit, etc. One embodiment of a "unit" within the scope of the present application comprises logic, circuits, devices, or microcode (i.e., micro instructions or native instructions), or a combination of logic, circuits, devices, or microcode, or equivalent elements that are employed to perform specified functions or specified operations. The elements employed to perform the specified functions or specified operations within a particular unit may be shared with other circuits, microcode, etc., that are employed to perform other functions or operations within the microprocessor 301. For example, in one embodiment, an integer unit comprises logic, circuits, devices, or microcode (i.e., micro instructions or native instructions), or a combination of logic, circuits, devices, or microcode, or equivalent elements that are employed to execute integer instructions. A floating point unit comprises logic, circuits, devices, or microcode (i.e., micro instructions or native instructions), or a combination of logic, circuits, devices, or microcode, or equivalent elements that are employed to execute floating point instructions. The elements employed execute integer instructions within the integer unit may be shared with other circuits, microcode, etc., that are employed to execute floating point instructions within the floating point unit. In one embodiment that is compatible with the x86 architecture, the Montgomery multiplication unit 316 operates in parallel with an x86 integer unit, an x86 floating point unit, an x86 MMX® unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the Montgomery multiplication unit 316 operating in parallel with a subset of the aforementioned x86 execution units. The Montgomery multiplication unit 316 is coupled to store logic 317 and provides the Montgomery product. The store logic 317 is also coupled to the data cache 315, which routes the generated Montgomery product to location 332 in system memory 321 for storage. The store logic 317 is coupled to write back logic 318. The write back logic 318 updates registers 310-311 within the register file 308 as the prescribed Montgomery multiplication operation is accomplished. In one embodiment, micro instructions flow through each of the aforementioned logic stages 302, 303, 304, 308, 314, 328, 317-318 in synchronization with a clock signal (not shown) so that operations can be concurrently executed in a manner substantially similar to operations performed on an assembly line.

Within the system memory 321, an application program that requires the prescribed Montgomery multiplication operation can direct the microprocessor 301 to perform the operation via a single Montgomery multiplication instruction 322, referred to herein for instructive purposes as a MONTMUL instruction 322. In a CISC embodiment, the MONTMUL instruction 322 comprises an instruction that prescribes a Montgomery multiplication operation. In a RISC embodiment, the MONTMUL instruction 322 comprises a micro instruction that prescribes a Montgomery multiplication operation. In one embodiment, the MONTMUL instruction 322 utilizes a spare or otherwise unused instruction opcode within an existing instruction set architecture. In one x86-compatible embodiment, the MONTMUL instruction 322 is a 4-byte instruction comprising an x86 REP prefix (i.e., 0×F3), followed by unused x86 2-byte opcode (e.g., 0×0FA6), followed a byte detailing a specific group mode to be employed during execution of the prescribed Montgomery multiplication operation. In one embodiment, the MONTMUL instruction 322 according to the present invention can be executed at the level of system privileges afforded to application programs and can thus be programmed into a program flow of instructions that are provided to the microprocessor 301 either directly by an application program or under control of an operating system 320. Since there is only one instruction 322 that is required to direct the microprocessor 301 to perform the prescribed Montgomery multiplication operation, it is contemplated that accomplishment of the operation is entirely transparent to the operating system 320.

In operation, the operating system 320 invokes an application program to execute on the microprocessor 301. As part of the flow of instructions during execution of the application program, a MONTMUL instruction 322 is fetched by fetch logic from memory 321 and is provided to the instruction register 302. Prior to execution of the MONTMUL instruction 322, however, instructions within the program flow direct the microprocessor 301 to initialize the contents of registers 309-312. Registers 310-311 are initialized to zero and register 312 is initialized with a value NUMBITS that indicates the number of bits in the operands A, B and the modulus M for the Montgomery multiplication operation. In addition, the context pointer register 309 is initialized with a context pointer CXTPTR that points to locations 324-328 in memory 321. Locations 324-328 are initialized prior to execution of the MONTMUL instruction 322 to indicate MPRIME, a first operand pointer APTR, a second operand pointer BPTR, a modulus pointer MPTR, and a Montgomery product pointer TPTR. In addition, prior to execution of the MONTMUL instruction 322, instructions in the program flow must store the first and second operands A, B and the modulus M in locations 329-331, respectively. It is required to initialize the registers 309-312 prior to executing the MONTMUL instruction 322 because the MONTMUL instruction 322 implicitly references the registers 308-312.

The aforementioned initialization steps are commensurate with those initialization steps accomplished within a present day software algorithm for performing Montgomery multiplication, however, rather than executing numerous additional instructions within the same software algorithm to generate the Montgomery product once the variables have been initialized, the apparatus according to the present invention allows for atomic and rapid generation of the product through execution of the single MONTMUL instruction that implicitly references the initialized variables.

Thus, the translation logic 303 retrieves the MONTMUL instruction 322 from the instruction register 302 and translates it into a corresponding sequence of micro instructions that directs the microprocessor 301 to perform the prescribed Montgomery multiplication operation. A first plurality of micro instructions 305-307 within the corresponding sequence of micro instructions specifically directs the Montgomery multiplication unit 316 to load data provided from the load logic 314, to execute the Montgomery multiplication, and to provide the generated Montgomery product to the store logic 317 for storage in the Montgomery product area 332 of memory 321 via the data cache 315. In one embodiment, the first plurality of micro instructions 305-307 is configured to iteratively load portions of the required parameters MPRIME, A, B, M, T to compute partial Montgomery products, and to provide the generated partial Montgomery products to the store logic 317. In a 32-bit embodiment, each iteration provides for generation of 32-bits of a Montgomery product T, which is stored in location 332. A second plurality of micro instructions (not shown) within the corresponding sequence of micro instructions directs other execution units (e.g., integer unit, etc., not shown) within the microprocessor 301 to perform other operations necessary to accomplish the prescribed Montgomery multiplication operation such as management of registers 310-311 that contain temporary results and state, and to provide for processing of pending interrupts, etc. In one embodiment, registers 309-312 are architectural registers. An architectural register 309-312 is a register that is defined within the instruction set architecture (ISA) for the particular microprocessor that is implemented. In an x86-compatible embodiment, the context pointer register 309 comprises register ESI and the numbits register 312 comprises register ECX.

In one embodiment, the Montgomery multiplication unit 316 is divided into a plurality of stages thus allowing for pipelining of successive operand and modulus blocks from locations 329-331 and to allow for successive generation of partial Montgomery products which are provided to location 332.

The block diagram 300 of FIG. 3 is provided to teach the necessary elements of the present invention and thus, much of the logic within a present day microprocessor 301 has been omitted from the block diagram 300 for clarity purposes. One skilled in the art will appreciate, however, that a present day microprocessor 301 comprises many stages and logic elements according to specific implementation, some of which have been aggregated herein for clarity purposes. For instance, the load logic 314 could embody an address generation stage followed by a cache interface stage, following by a cache line alignment stage. What is important to note, however, is that a complete Montgomery multiplication operation provided operands A, B, M, MPRIME is directed according to the present invention via a single instruction 322 whose operation is otherwise transparent to considerations of the operating system 320 and whose execution is accomplished via a dedicated Montgomery multiplication unit 316 that operates in parallel with and in concert with other execution units within the microprocessor 301. The present inventors contemplate provision of alternative embodiments of the Montgomery multiplication unit 316 in embodiment configurations that are analogous to provision of dedicated floating point unit hardware within a microprocessor in former years. Operation of the Montgomery multiplication unit 316 and associated MONTMUL instruction 322 is entirely compatible with the concurrent operation of legacy operating systems 320 and applications, as will be described in more detail below.

Figure 4:
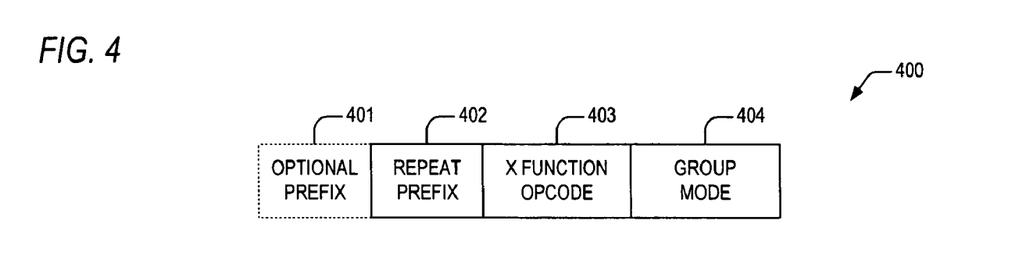
FIG. 4 is a block diagram showing one embodiment of an atomic Montgomery multiplication instruction according to the present invention.

Now referring to FIG. 4, a block diagram is provided showing one embodiment of an atomic Montgomery multiplication instruction 400 according to the present invention. The Montgomery multiplication instruction 400 includes an optional prefix field 401, which is followed by a repeat prefix field 402, which is followed by an opcode field 403, which is followed by a group mode field 404. In one embodiment, contents of the fields 401-404 comport with the x86 instruction set architecture. Alternative embodiments contemplate compatibility with other instruction set architectures.

Operationally, the optional prefix 401 is employed in many instruction set architectures to enable or disable certain processing features of a host microprocessor such as directing 16-bit or 32-bit operations, directing processing or access to specific memory segments, etc. The repeat prefix 402 indicates that the Montgomery multiplication operation prescribed by the Montgomery multiplication instruction 400 is to be accomplished on a plurality of blocks of operand data, where the block size is a function of the number of bits in the Montgomery multiplication operands MPRIME, A, B, M and the size of partial Montgomery products that the Montgomery multiplication unit 316 is capable of supporting. The repeat prefix 402, in one embodiment, also implicitly directs a comporting microprocessor to employ the contents of a register therein as a pointer to locations in system memory that contain or point to the Montgomery multiplication operands MPRIME, A, B, M, T for accomplishment of the specified Montgomery multiplication operation. As noted above, in an x86-compatible embodiment, the value of the repeat prefix 402 is 0xF3.

The opcode field 403 prescribes that the microprocessor accomplish a Montgomery multiplication operation. The present invention contemplates a preferred choice of the opcode value 403 as one of the spare or unused opcode values within an existing instruction set architecture so as to preserve compatibility within a conforming microprocessor with legacy operating system and application software. For example, as noted above, an x86-compatible embodiment of the opcode field 403 employs value 0×0FA6 to direct execution of the specified Montgomery multiplication operation. The group mode field 404 prescribes the particular Montgomery multiplication mode to be employed during the specified Montgomery multiplication operation, as will now be discussed with reference to FIG. 5.

Figure 5:
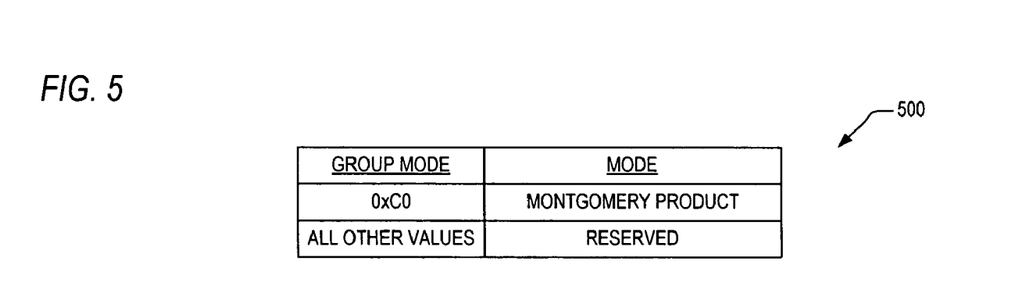
FIG. 5 is a table illustrating exemplary group mode field values according to the atomic Montgomery multiplication instruction of FIG. 4.

FIG. 5 is a table 500 illustrating exemplary group mode field values according to the atomic Montgomery multiplication instruction of FIG. 4. Value 0×C0 prescribes that the Montgomery multiplication operation be accomplished according to a Montgomery product mode. All other values of the group mode field 404 are reserved. The reserved values are provided to allow for expansion.

Figure 6:
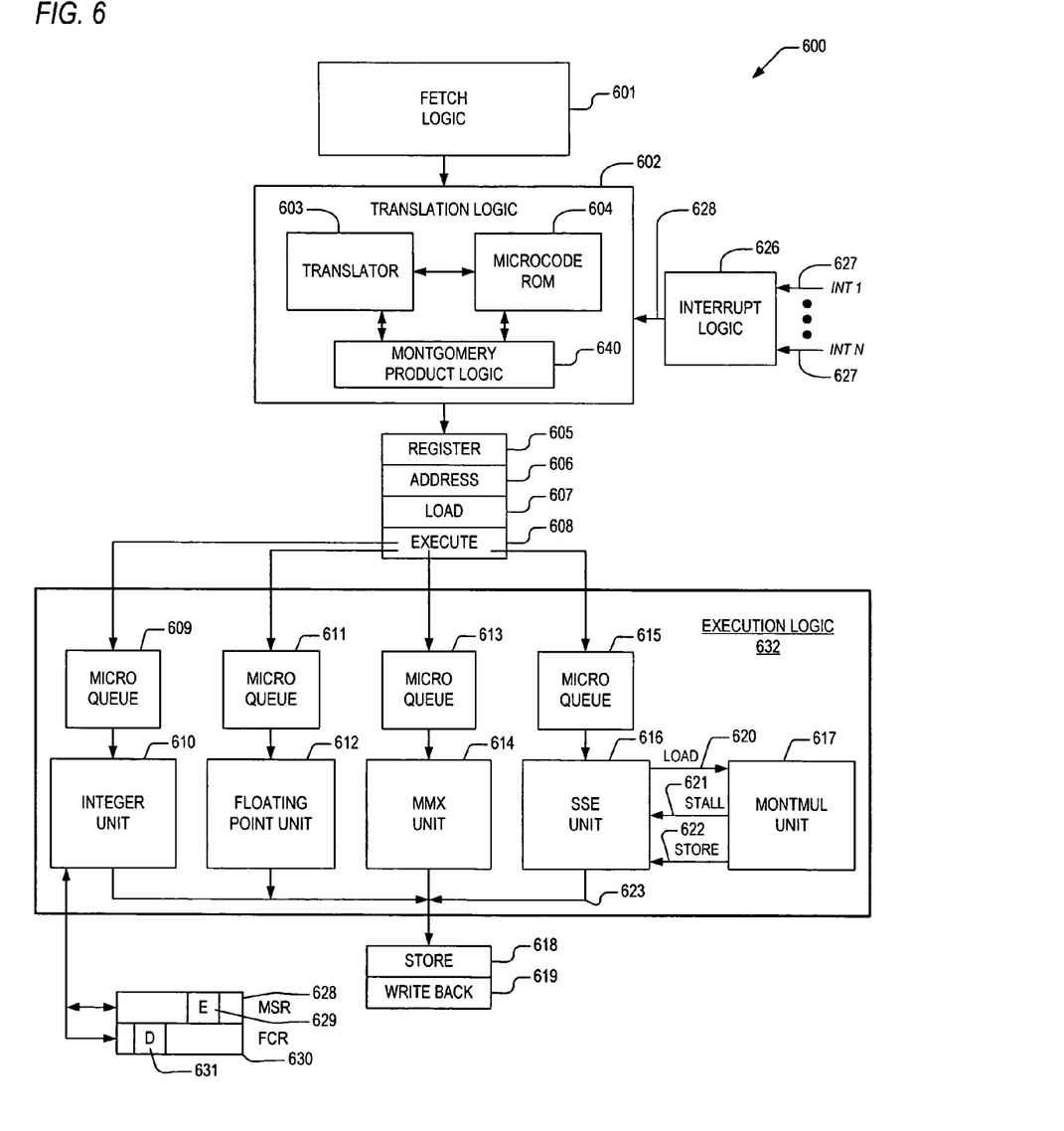
FIG. 6 is a block diagram detailing a Montgomery multiplication unit within an x86-compatible microprocessor according to the present invention.

Now turning to FIG. 6, a block diagram is presented detailing a Montgomery multiplication unit 617 within an x86-compatible microprocessor 600 according to the present invention. The microprocessor 600 includes fetch logic 601 that fetches instructions from memory (not shown) for execution. The fetch logic 601 is coupled to translation logic 602. The translation logic 602 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 602 may be shared with other circuits, microcode, etc., that are employed to perform other functions within the microprocessor 600. The translation logic 602 includes a translator 603 that is coupled to a microcode ROM 604, and Montgomery product logic 640 that is coupled to both the translator 603 and the microcode ROM 604. Interrupt logic 626 couples to the translation logic 602 via bus 628. A plurality of software and hardware interrupt signals 627 are processed by the interrupt logic 626 which indicates pending interrupts to the translation logic 602. The translation logic 602 is coupled to successive stages of the microprocessor 600 including a register stage 605, address stage 606, load stage 607, execute stage 608, store stage 618, and write back stage 619. Each of the successive stages include logic to accomplish particular functions related to the execution of instructions that are provided by the fetch logic 601 as has been previously discussed with reference like-named elements in the microprocessor of FIG. 3. The x86-compatible embodiment 600 depicted in FIG. 6 features execution logic 632 within the execute stage 608 that includes parallel execution units 610, 612, 614, 616, 617. An integer unit 610 receives integer micro instructions for execution from micro instruction queue 609. A floating point unit 612 receives floating point micro instructions for execution from micro instruction queue 611. An MMX® unit 614 receives MMX micro instructions for execution from micro instruction queue 613. An SSE® unit 616 receives SSE micro instructions for execution from micro instruction queue 615. In the exemplary x86 embodiment shown, a Montgomery multiplication unit 617 is coupled to the SSE unit 616 via a load bus 620, a stall signal 621, and a store bus 622. The Montgomery multiplication unit 617 shares the SSE unit's micro instruction queue 615. An alternative embodiment contemplates stand-alone parallel operation of the Montgomery multiplication unit 617 in a manner like that of units 610, 612, 614, and 616 The integer unit 610 is coupled to a machine specific register 628 to evaluate the state of an E bit 629. The state of the E bit 629 indicates whether or not the Montgomery multiplication unit 617 is present within the microprocessor 600. The integer unit 610 also accesses a D bit 631 in a feature control register 630 to enable or disable the Montgomery multiplication unit 617. As with the microprocessor embodiment 301 of FIG. 3, the microprocessor 600 of FIG. 6 features elements essential to teach the present invention in the context of an x86-compatible embodiment and for clarity aggregates or omits other elements of the microprocessor. One skilled in the art will appreciate that other elements are required to complete the interface such as a data cache (not shown), bus interface unit (not shown), clock generation and distribution logic (not shown), etc.

In operation, instructions are fetched from memory (not shown) by the fetch logic 601 and are provided in synchronization with a clock signal (not shown) to the translation logic 602. The translation logic 602 translates each instruction into a corresponding sequence of micro instructions that are sequentially provided in synchronization with the clock signal to subsequent stages 605-608, 618, 619 of the microprocessor 600. Each micro instruction within a sequence of micro instructions directs execution of a sub-operation that is required to accomplish an overall operation that is prescribed by a corresponding instruction such as generation of an address by the address stage 606, addition of two operands within the integer unit 610 which have been retrieved from prescribed registers (not shown) within the register stage 605, storage of a result generated by one of the execution units 610, 612, 614, 616, 617 in memory by the store logic 618, etc. Depending upon the instruction that is being translated, the translation logic 602 will employ the translator 603 to directly generate the sequence of micro instructions, or it will fetch the sequence from the microcode ROM 604, or it will employ the translator 603 to directly generate a portion of the sequence and fetch the remaining portion of the sequence from the microcode ROM 604. The micro instructions proceed sequentially through the successive stages 605-608, 618, 619 of the microprocessor 600 in synchronization with the clock. As micro instructions reach the execute stage 608, they are routed by the execution logic 632 along with their operands (retrieved from registers within the register stage 605, or generated by logic within the address stage 606, or retrieved from a data cache by the load logic 607) to a designated execution unit 610, 612, 614, 616, 617 by placing the micro instructions in a corresponding micro instruction queue 609, 611, 613, 615. The execution units 610, 612, 614, 616, 617 execute the micro instructions and provide results to the store stage 618. In one embodiment, the micro instructions include fields indicating whether or not they can be executed in parallel with other operations.

Responsive to fetching a MONTMUL instruction as described above, the translation logic 602 generates associated micro instructions that direct logic within subsequent stages 605-608, 618, 619 of the microprocessor 600 to perform the prescribed Montgomery multiplication operation. A first plurality of the associated micro instructions are routed directly to the Montgomery multiplication unit 617 and direct the unit 617 to load blocks of operand data provided over the load bus 620, to generate a Montgomery product, or to provide generated blocks of output data (i.e., partial Montgomery products) over the store bus 622 for storage in memory by the store logic 618. A second plurality of the associated micro instructions are routed to other execution units 610, 612, 614, 616 to perform other sub-operations that are necessary to accomplish the prescribed Montgomery multiplication operation such as testing of the E bit 629, enabling the D bit 631, updating registers (e.g., state register, temp register) within the register stage 605, processing of interrupts 627 indicated by the interrupt logic 626, etc. The associated micro instructions are ordered to provide for optimum performance of specified Montgomery multiplication operations on multiple blocks of input data by interlacing integer unit micro instructions within sequences of Montgomery multiplication unit micro instructions so that integer operations can be accomplished in parallel with Montgomery multiplication unit operations. Micro instructions are included in the associated micro instructions to allow for and recover from pending interrupts 627. Because all of the pointers to Montgomery multiplication parameters, number of bits data, temporary data, and state data are provided within x86 architectural registers, their values are saved when interrupts are processed and the states are restored upon return from interrupts.

The Montgomery product logic 640 is employed for the performance of Montgomery product generation operations. The Montgomery product logic 640 ensures that the associated micro instructions are ordered to allow for the state and temp registers and for Montgomery partial products to be updated prior to processing interrupts 627.

Although the present invention and its objects, features, and advantages have been described in detail, other embodiments are encompassed by the invention as well. For example, the present invention has been discussed at length according to embodiments that are compatible with the x86 architecture. However, the discussions have been provided in such a manner because the x86 architecture is widely comprehended and thus provides a sufficient vehicle to teach the present invention. The present invention nevertheless comprehends embodiments that comport with other instruction set architectures such as PowerPC®, MIPS®, and the like, in addition to entirely new instruction set architectures.

The present invention moreover comprehends execution of Montgomery multiplication operations within elements of a computing system other than the microprocessor itself. For example, the Montgomery multiplication instruction according to the present invention could easily be applied within an embodiment of a Montgomery multiplication unit that is not part of the same integrated circuit as a microprocessor that exists as part of the computer system. It is anticipated that such embodiments of the present invention are in order for incorporation into a chipset surrounding a microprocessor (e.g., north bridge, south bridge) or as a processor dedicated for performing cryptographic operations where the Montgomery multiplication instruction is handed off to the processor from a host microprocessor. It is contemplated that the present invention applies to embedded controllers, industrial controllers, signal processors, array processors, and any like devices that are employed to process data. The present invention also comprehends an embodiment comprising only those elements essential to performing Montgomery multiplication operations as described herein. A device embodied as such would indeed provide a low-cost, low-power alternative for performing Montgomery multiplication operations only, say, as a modular exponentiation processor within a communications system. For clarity, the present inventors refer to these alternative processing elements as noted above as processors.

In addition, although the present invention has been described in terms of 32-bit partial products, it is considered that various different block sizes can be employed by merely changing the size of elements within the Montgomery multiplication unit.

Furthermore, embodiments of the present invention have been described above in terms of an "in-order" processor where instructions proceed sequentially through a single pipeline for execution. But, it is noted that the present invention comprehends multiple-pipeline (e.g., "superscalar") architectures as well, where instructions are issued "out-of-order" to various units for execution and where results are re-ordered according to program flow following retirement of the instructions. Such concepts not only apply to single program threads, but to architectures that allow for simultaneous execution of multiple program threads as well.

Finally, although the present invention has been specifically discussed as a single Montgomery multiplication unit, the invention also comprehends provision of multiple Montgomery multiplication units operatively coupled in parallel with other execution units in a conforming microprocessor where each of the multiple Montgomery multiplication units is configured to perform a specific Montgomery multiplication to allow for rapid generation of modular products.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus in a microprocessor, for accomplishing modular multiplication operations, comprising:
   translation logic, configured to receive an atomic Montgomery multiplication instruction from a source therefrom, wherein said atomic Montgomery multiplication instruction prescribes generation of a Montgomery product, and configured to translate said atomic Montgomery multiplication instruction into a sequence of micro instructions specifying sub-operations required to accomplish generation of said Montgomery product, wherein said atomic Montgomery multiplication instruction implicitly references a plurality of registers within the microprocessor, and wherein said plurality of registers comprises:
      a first register, wherein contents of said first register comprise a first pointer to a first memory address, said first memory address specifying a first location in memory, wherein said first location comprises:
         a first operand pointer, said first operand pointer pointing to a second memory address, said second memory address specifying a second location in said memory comprising a first operand for generation of said Montgomery product; and
   execution logic, operatively coupled to said translation logic, configured to receive said sequence of micro instructions, and configured to perform said sub-operations to generate said Montgomery product.

2. The apparatus as recited in claim 1, wherein said first location further comprises:
   a second operand pointer, said second operand pointer pointing to a third memory address, said third memory address specifying a third location in said memory comprising a second operand for generation of said Montgomery product.

3. The apparatus as recited in claim 1, wherein said first location comprises:
   a result pointer, said result pointer pointing to a second memory address, said second memory address specifying a second location in said memory, wherein, upon generation of said Montgomery product, said Montgomery product is stored to said second location.

4. The apparatus as recited in claim 1, wherein said first location comprises:
   a modulus pointer, said modulus pointer pointing to a second memory address, said second memory address specifying a second location in said memory comprising a modulus for generation of said Montgomery product.

5. The apparatus as recited in claim 1, wherein said first location comprises:
an integer, wherein said integer is related to both a modulus and a radix chosen for generation of said Montgomery product, and wherein said integer is employed to generate said Montgomery product.

6. The apparatus as recited in claim 5, wherein said radix is chosen to be an integer multiple of 32.

7. The apparatus as recited in claim 1, wherein said plurality of registers comprises:
a first register, wherein contents of said first register comprise a value indicating a number of bits in a first operand, a second operand, and a modulus for generation of said Montgomery product.

8. The apparatus as recited in claim 1, wherein said atomic Montgomery multiplication instruction is prescribed according to the x86 instruction format.

9. A method for performing modular multiplication operations in a processor, the method comprising:
fetching a atomic Montgomery multiplication instruction from memory, wherein the atomic Montgomery multiplication instruction prescribes generation of a Montgomery product, said fetching comprising:
implicitly referencing a plurality of registers within the processor, wherein said implicitly referencing comprises:
specifying a first register, wherein contents of the first register comprise a first pointer to a first memory address, the first memory address indicating a first location in the memory, wherein the first location comprises:
a first operand pointer, the first operand pointer pointing to a second memory address, the second memory address indicating a second location in the memory comprising a first operand for generation of the Montgomery product; and
executing the atomic Montgomery multiplication instruction to generate the Montgomery product.

10. The method as recited in claim 9, wherein the first location further comprises:
a second operand pointer, the second operand pointer pointing to a third memory address, the third memory address indicating a third location in the memory comprising a second operand for generation of the Montgomery product.

11. The method as recited in claim 9, wherein the first location comprises:
a result pointer, the result pointer pointing to a second memory address, the second memory address specifying a second location in said memory, wherein, upon generation of the Montgomery product, the Montgomery product is stored to the second location.

12. The method as recited in claim 9, wherein the first location comprises:
a modulus pointer, the modulus pointer pointing to a second memory address, the second memory address specifying a second location in said memory comprising a modulus for generation of the Montgomery product.

13. The method as recited in claim 9, wherein said first location comprises:
an integer, wherein the integer is related to both a modulus and a radix chosen for generation of the Montgomery product, and wherein the integer is employed to generate the Montgomery product.

14. The method as recited in claim 13, wherein the radix is chosen to be an integer multiple of 32.

15. The method as recited in claim 9, wherein said implicitly referencing comprises:
specifying a first register, wherein contents of the first register comprise a value indicating a number of bits in a first operand, a second operand, and a modulus for generation of the Montgomery product.

16. The method as recited in claim 9, wherein said fetching comprises:
prescribing the atomic Montgomery multiplication instruction according to the x86 instruction format.

17. The method as recited in claim 9, further comprising:
translating the atomic Montgomery multiplication instruction into a sequence of micro instructions, wherein the micro instructions prescribe sub-operations required to accomplish generation of the Montgomery product.

* * * * *